Oct. 18, 1932.    O. KRUEGER    1,883,801
SIGNAL DEVICE
Filed Dec. 26, 1928

Oscar Krueger,
INVENTOR
BY Victor J. Evans
ATTORNEY

Patented Oct. 18, 1932

1,883,801

UNITED STATES PATENT OFFICE

OSCAR KRUEGER, OF CHICAGO, ILLINOIS

SIGNAL DEVICE

Application filed December 26, 1928. Serial No. 328,607.

This invention relates to certain novel improvements in signal devices, and has for its principal object the provision of an improved construction of this character which will be highly efficient in use and economical in manufacture.

Another object of my invention is to provide a device of the above named character which will be arranged in such a manner that it will be particularly adapted for indicating the direction of a turn to be made by a vehicle and this consists in arranging the signal device at a suitable point on the vehicle which will serve to indicate the direction of a turn to be taken thereby.

Another object of the invention, ancillary to the foregoing, is to arrange the signal mechanisms such that they will embody individual lamps.

A further object of the invention is to arrange the mechanisms such that the operator of the device will be apprised of the fact that one of his signal lamps is operating and to arrange the mechanism such that in the event that one of the signal lights is not operating, the mechanism used to apprise the operator will also be rendered inoperative.

A still further object of the invention is to provide a device of the above named character which will be arranged so as to be relatively compact in order that the same may be mounted on the steering column of a vehicle.

Other and further objects will appear hereinafter.

The invention consists in the novel combination and arrangement of parts to be hereinafter described and claimed.

The invention will best be understood by reference to the accompanying drawing, wherein a preferred form of construction is shown, and in which.

Figure 1:
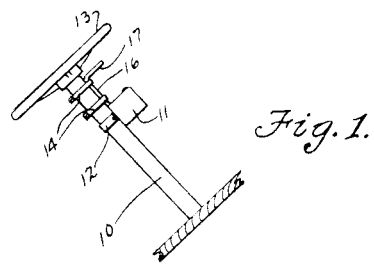
Fig. 1 is a side elevational view of a preferred form of construction for my invention in association with the steering column of a motor vehicle.

In the drawing, wherein I have illustrated the preferred form of construction for my invention, 10 indicates the steering column of a vehicle. The switch mechanism for my improved device is adapted to be mounted in a housing 11, which in the present instance is clamped to the steering column 10 through the medium of the strap 12 although it is to be understood that the switch mechanism may be mounted in any desired location and might be secured in any approved manner. Associated with the steering column 10 and located between the wheel 13 of the housing 11 are straps 14 which are adapted to provide bearings for the operating rod 16 which terminates in a handle portion 17 that is adapted to be disposed just below the wheel 13. The handle 17 is located such that it may be easily grasped and manipulated so as to cause operation of my improved signal device. This handle 17 is adapted to be moved to the right when the operator of the vehicle desires to turn the vehicle in this direction, and when a turn is to be made to the left, this handle 17 is moved in this direction.

Figure 2:
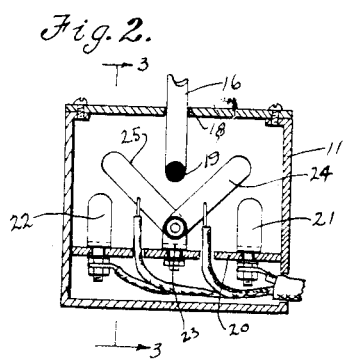
Fig. 2 is a transverse sectional view through the switch mechanism employed in the device.
Figure 3:
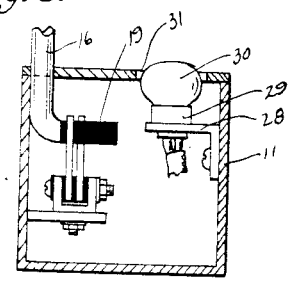
Fig. 3 is a sectional view taken substantially on the line 3—3 of Figure 2.
Figure 4:
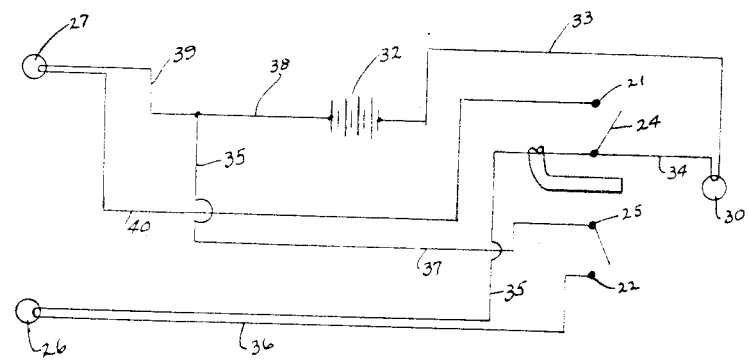
Fig. 4 is a schematic view depicting the electrical connections employed in the device.

The switch mechanism which is controlled from the rod 16 is illustrated best in Figures 2 and 3, and herein it will be seen that the rod 16 extends into the housing 11 through an opening 18. The portion of the rod 16 disposed interiorly of the housing 11 terminates in a right-angularly extending portion 19 which is preferably made of insulating material clearly illustrated in the drawing. Mounted in the housing 11 and adapted to be spaced from the lower wall thereof is a partition 20 on which the contact portions of my improved switch mechanisms are adapted to be mounted. These switch mechanisms comprise two stationary contacts 21 and 22 which are carried by and suitably insulated from the partition 20. A bracket member 23 is disposed between the contacts 21 and 22 and is adapted to be insulated from and carried by the partition 20. Adapted to be pivotal about the bracket 23 are the switch arms 24 and 25 and the insulated portion 19 of the rod 16 is adapted to extend between the arms as clearly illustrated in Figure 2. When the handle 17 is manipulated so as to turn the rod 16 to the right, the portion 19 engages the arm 25 and moves the same into contact with the contact 22 so as to close the circuit to the right turn indicator lamp 26. When the handle 17 is manipulated to the left the portion 19 engages the arm 24 and moves the same into engagement with the contact 21 so as to close the circuit to the left turn indicator lamp 27.

Mounted on a suitable bracket 28 in the housing 11 is a socket 29 which is adapted to receive the indicator lamp 30 which in the present instance extends through an opening 31 in the upper side of the housing 11. This lamp 30 is adapted to be individually in series with the lamps 26 and 27 and therefore, when either of these lamps is operating the lamp 30 will also operate. The electrical connections employed to accomplish this are now to be described.

The current is drawn from a suitable source of power such as the battery 32 which may be the battery of the vehicle. One terminal of the battery 32 is connected through a lead 32 to one terminal of the lamp 30. The other terminal of the lamp 33 is connected through a lead 34 to the switch blade 34. A lead 35 connects the switch blade 34 with one terminal of the lamp 26. The opposite terminal of the lamp 26 is connected by a lead 36 to the contact 22. The switch blade 25 is connected by a lead 37 to the lead 38 that is connected to the other terminal of the battery 32. Therefore, when the switch blade 25 is moved into engagement with the contact 24 current will be drawn through the lead 38, lead 37, switch blade 25, contact 22, lead 36, lamp 26, lead 35, switch blade 24, lead 34, lamp 30 and lead 33, to the battery. It is therefore apparent that both lamps 26 and 30 will be illuminated. One terminal of the lamp 27 is connected by a lead 39 to the lead 38. The other terminal of the lamp 27 is connected by a lead 40 to the contact 21. When the switch blade 24 is moved into engagement with the contact 21 current is drawn through lead 38, lead 39, lamp 27, lead 40, contact 21, switch blade 24, lead 34, lamp 30 and lead 33. It is apparent that both the lamps 27 and 30 will be illuminated. It is also apparent that when the lamp 26 is operating the circuit between the blade 24 and the contact 21 is opened and therefore, the lamp 27 will not operate, even though the lamp 30 is operating. Also, when the circuit to the lamp 27 is closed, the switch blade 25 is held from engagement with the contact 22 and therefore current will not flow through the lamp 26 even though the lamp 30 is operating.

It is therefore apparent that I have provided a compact and simple switch arrangement, which will require but one pilot lamp, and one which will be arranged such that it may be connected with a minimum number of leads. It is also apparent that I have provided a compact device which may be expeditiously mounted in a vehicle.

It is also apparent that this device will be simple in construction and operation. Further, in view of the fact that the pilot lamp 30 will operate only when the lamps 26 and 27 are operating, it is apparent that the operator of the vehicle will always be apprised when one of the signal indicating lamps is operating.

It is apparent that the portion 19 serves to move the blades 24 and 25 into engagement with the contacts 21 and 22, and by turning this portion in the opposite direction it is apparent that these switch blades are also moved back into neutral position which is indicated in Figure 2.

While I have illustrated and described my invention, outlining the preferred form of construction therefor, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

In combination with the steering column of an automotive vehicle, a switch mechanism, a housing for said switch mechanism adapted to be mounted on the steering column, said switch mechanism including stationary contacts, means for mounting said stationary contacts in said housing, movable contacts providing arm members, means for pivotally mounting said arm members including a manually operated member having a right-angularly extending portion at one end providing a handle and having a right-angularly extending portion at the opposite end, said last-mentioned portion extending between said arm members whereby when said handle is operated in one direction one of said arms will be moved into contacting engagement with one of said stationary contacts and the other of said stationary contacts will be in disengaged position and whereby when said handle is operated said last-mentioned arm will be moved into contacting engagement with one of said stationary contacts and said first-mentioned arm will be released from contacting engagement, and means for mounting said manually operated member on the steering column of an automotive vehicle.

In testimony whereof I affix my signature.

OSCAR KRUEGER.